United States Patent [19]

Walters et al.

[11] Patent Number: 4,762,219

[45] Date of Patent: Aug. 9, 1988

[54] BOX CONVEYING AND INDEXING SYSTEM

[75] Inventors: Richard D. Walters, Strathmore; Jon De Young, Fresno County; Clarence M. Rasmussen; Louie S. Almares, both of Tulare County, all of Calif.

[73] Assignee: Pennwalt Corporation, Philadelphia, Pa.

[21] Appl. No.: 768,074

[22] Filed: Aug. 21, 1985

[51] Int. Cl.⁴ .................. B65G 43/08; B65G 47/46
[52] U.S. Cl. .................... 198/358; 198/355; 198/464.2
[58] Field of Search ........... 198/349, 351, 352–356, 198/358, 366–368, 370, 444, 451, 464.2, 463.4, 463.5, 463.6, 464.1, 464.4

[56] References Cited

U.S. PATENT DOCUMENTS

| | | | |
|---|---|---|---|
| 2,886,164 | 5/1959 | Solecki | 198/358 |
| 2,976,376 | 3/1961 | Klamp | 198/349 X |
| 3,049,247 | 8/1962 | Lemelson | 198/349 X |
| 3,096,871 | 7/1963 | Anderson | 198/464.2 X |
| 3,878,933 | 4/1975 | Bauer et al. | 198/355 X |
| 3,917,050 | 11/1975 | Gregor | 198/358 |
| 3,955,678 | 5/1976 | Moyer | 198/356 X |
| 3,986,597 | 10/1976 | Valentino | 198/358 |
| 4,181,947 | 1/1980 | Krauss et al. | 198/349 X |
| 4,281,756 | 8/1981 | Bruno | 198/356 |

Primary Examiner—Robert J. Spar
Assistant Examiner—Lyle K. Kimms

[57] ABSTRACT

Empty boxes for packing articles thereinto, typically fruit, are packed by handpackers, for example, stationed along a plurality of fruit packing lines, each line provided with an empty box accumulation station. As soon as a box is packed and conveyed to a palletizer, an empty box is conveyed to the accumulation station on conveyor belt means from a box buffer station in closest proximity thereto and immediately upstream thereof to stack up against the last, or most upstream of the accumulated boxes, causing each box in each upstream buffer station to be conveyed downstream to thereby maintain each buffer station satisfied, the last box of the most upstream buffer station being supplied from a main box holding station. Box movement is controlled by photocell switches inputting signals to a microprocessor indicating the absence or presence of a box at a predetermined location. Microprocessor generates a responsive output signal which actuates solenoid type box indexers or pushers provided at predetermined locations along the conveyor belts.

10 Claims, 2 Drawing Sheets

BOX CONVEYING AND INDEXING SYSTEM

STATEMENT OF THE INVENTION

This invention relates to an improved system for rapidly, economically, and efficiently making empty boxes or cartons available to hand packers of fruit, for example, along a multiplicity of pack lines or stations.

BACKGROUND AND SUMMARY OF THE INVENTION

Heretofore, when hand packers of fruit along pack lines or stations had completed the packing of the empty box or carton, or the last of an accumulation of empty boxes, and the packed box or boxes would be conveyed to a palletizer, manual or automatic, a delay would often occur before an empty box or accumulation of boxes would reach the idled packer, due primarily to the distance an empty box would be required to travel, i.e., from the empty box holding station to the hand-packing station requesting the empty boxes, thereby resulting in decreased box filling time; inconsistent empty box distribution to filling or packing stations, or filled boxes to palletizing stations; increased hand labor, time consumed, and packing costs.

The present invention provides an accumulation buffer station immediately upstream each of the empty box accumulation stations provided for each of the handpacking stations. Each of the accumulation buffer stations holds or stores several empty boxes in readiness for instant transfer to the empty box accumulation stations upon a primary call or request from the accumulation station to a microprocessor, in the form of a signal from a normally closed photocell switch indicating the last box in the empty box accumulation station has advanced down the line thereby opening the switch. The signal instantaneously actuates a box kicker, pusher, or indexer, through the microprocessor, by means of a solenoid which kicks or pushes the empty box from the accumulation buffer station toward the empty box accumulation station for filling by the handpackers.

DETAILED DESCRIPTION OF THE INVENTION

Figure 1:
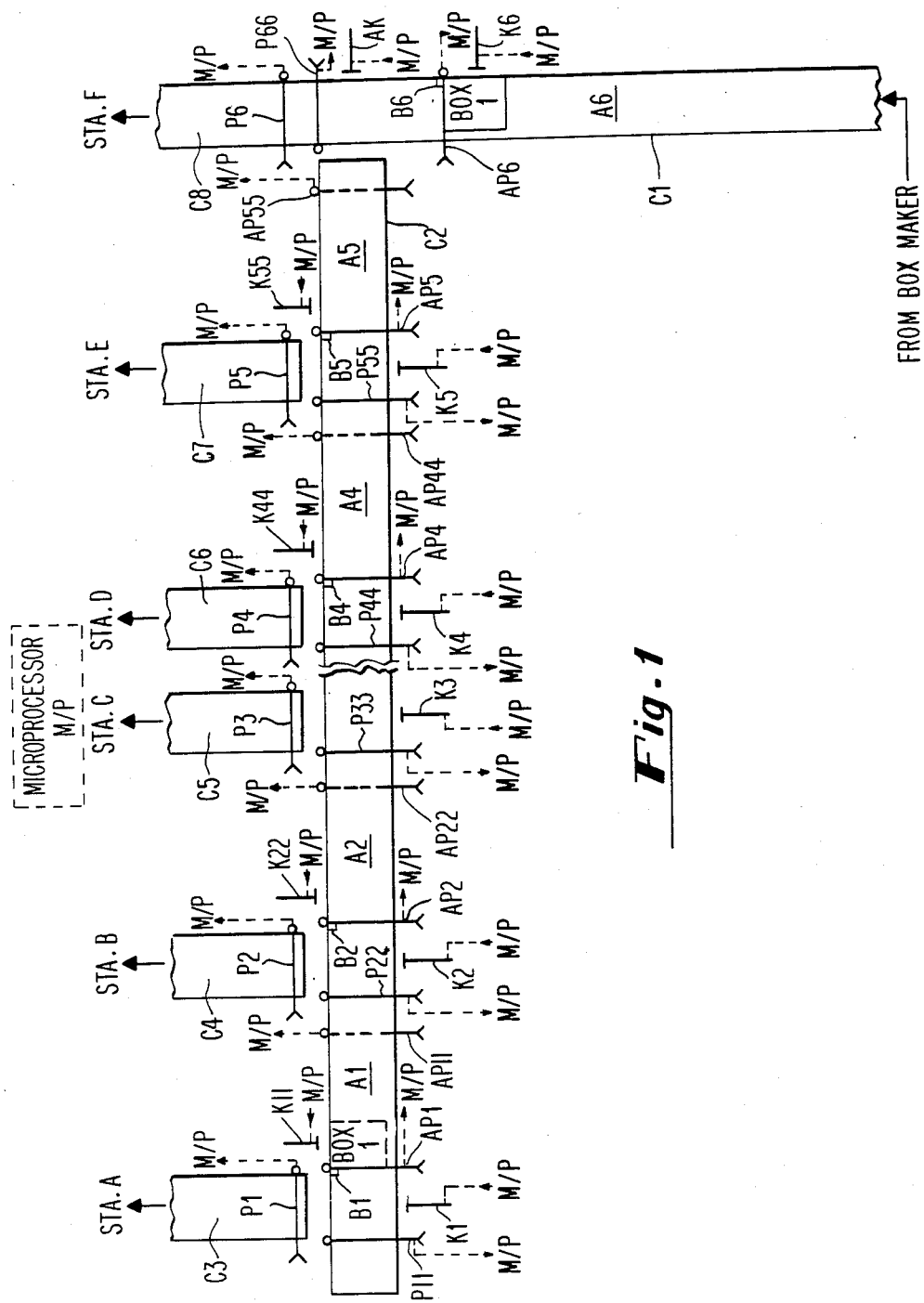
FIG. 1 is a schematic representation of the present empty box conveyor and indexer for use with fruit handpackers along a 6-station system.

In FIG. 1, stations A through F comprise empty box accumulation stations for the use of handpackers of fruit, or automatic box fillers, or combinations thereof. Reference however is made hereinafter to stations A through F as being utilized for the packing of fruit by hand. It is understood that the box conveying and indexing system of the present invention may be provided with more or less than 6 stations, and that articles other than fruit may be automatically filled or handpacked into boxes conveyed and indexed by the present invention.

Typically, each of stations A through F may accumulate 22 empty boxes for filling or packing by the handpacker or handpackers at that station.

Conveyors C3 through C8 may comprise skate wheel conveyors, appropriately sloped, or powered belt conveyors, or combinations of each. The length of conveyors C3 through C8 for a 22 box accumulation system for each station may approach 40 feet.

Components P1 through P6 are conventional photocell switches, which are normally closed (N.C.) as indicated in Table I below. Photocells P1 through P6 are connected to a microprocessor, shown in FIG. 1 within the dashed lines. Photocells P1 through P6 generate primary request signals representing input signals to the microprocessor. i.e., a request for empty boxes which are given priority over requests from other stations. For purposes of clarity, all connections in FIG. 1 leading to and from the microprocessor are shown by several dashed lines terminating in an arrow and the abbreviation "M/P". The microprocessor, in turn, outputs signals to a kicker or indexer which pushes an empty box stored in the closest upstream accumulation buffer station A1 through A5 to the empty box accumulation station for the handpackers requesting the empty box via mechanisms later described. Station F is not provided with an identical accumulation buffer station as are stations A through E, but boxes may be accumulated for the use of station F by means, later described.

Operation of the photocell switches is conventional. Thus, when the last empty box in any accumulation station A through E for the handpackers advnaces down the line, i.e., on a conveyor C3 through C7, to thereby no longer interrupt the photocell light beam of switches P1 through P5, a signal is inputted to the microprocessor to output a signal to a respective kicker.

When normally closed photo switch P6 of station F is actuated by a box advancing downstream on conveyor C8 to thereby no longer interrupt the light beam of switch P6, an empty box replaces the advanced box by means of the microprocessor temporarily deactivating the main accumulation kicker AK which permits conveyor C1 to convey the replacement box or boxes to station F.

A normally open photocell switch generates a signal when a box interrupts the photo beam.

The kickers are suitably conventional pneumatic or hydraulic type actuators, i.e., cylinders shifted by solenoid directional control valves. Data for the kicker components in the system are presented in Table II below.

In order to more fully understand the present invention, the movement of box 1 at the main holding station A6 to the box accumulation station for the handpackers at station A will now be described. Assume no other boxes are present in the system.

A box or carton maker forms box 1 from a flat pattern. Box 1 is transferred to a continuously moving conveyor belt C1 when the box contacts a conventioal mechanical box stop B6 typically comprising a block of suitable plastic having an impact face measuring about 4"×1". Conveyor belt C1 is suitably a friction surface belt capable of carrying boxes thereon while effecting no damage to the undersurfaces thereof while maintained immobile against the box stop by a continuously moving belt.

Photocell switch AP6 at the main box holding station is normally open (N.O) and indicates the presence or absence of a box thereat. A request from primary photocell switch P1 at station A, indicating the absence of a box thereat, generates an input signal to the microprocessor which outputs a signal to kicker K6 which responds by pushing box 1 away from box stop B6 enabling belt C1 to convey the box downstream until it breaks the light beam of photocell switch P66 whereupon main accumulation kicker AK pushes box 1 onto conveyor belt C2.

It is noted that kicker or pusher or indexer K6 was actuated since, as aforementioned, no boxes other than box 1 are presently in the system, and hence, no boxes are yet stored in closer accumulation buffer stations A1, A2, A4 or A5. The presence of a box at any of the accumulation buffer stations closer to station A than the main holding station A6 would have caused the microprocessor to output a signal to the kicker associated with that closer accumulation buffer station.

Box 1 next encounters normally closed photo switch AP55, which is calling for or requesting an empty box to be accumulated at accumulation buffer station A5. Similarly, photo switches AP44, AP22 and AP11 are requesting empty boxes for satisfying buffer stations A4, A2 and A1 respectively. Also primary photo switches P2 through P6 are requesting boxes for their respective stations B through F. A call or request signal from primary photo switch P1 inputted to the microprocessor however supercedes a request from any of the other primary call stations B through F. Similarly, a request from primary photo switch P2 supersedes one from primary switch P3, and so on. A request for boxes made by any primary photo switch, P5, for example, supersedes or takes priority over a request by any of the accumulation buffer request photocell switches AP11, AP22, AP44 and AP55.

Conveyor belt C2 next conveys box 1 until it impacts box stop B5. Primary photo switch P1 however is still calling for box 1 whereupon kicker K55 pushes the box away from box stop B5 until, through a series of similar maneuvers, box 1 is stopped by box stop B1 at station A, as shown in phantom lines, whereupon kicker K11 pushes the box away from box stop B1 enabling belt C2 to convey the box further downstream until normally open photo switch P11 is activated to trigger the microprocessor to actuate kicker K1 which causes the box to be carried onto conveyor C3 to the box accumulation station for the handpackers. If station A requires more than one box, box 1 will be conveyed beyond normally closed primary photo switch P1 causing switch P1 to continue the request for more boxes until switch P1 no longer inputs any signal to the microprocessor.

If a box is knocked from conveyor belt C2 by accident or malfunction of the mechanical apparatus prior to satisfying the call or request for boxes for photo switch P1, for example, one or more of the photo switches downstream the point where the box left the conveyor belt can be employed to track the box and generate input pulses to the microprocessor which will then cause another box to be fed onto conveyor C1 from the box maker.

In practice, main holding station A6 will accumulate boxes to capacity. When box 1 is transported to station A to help satisfy the requirement for boxes thereat, the box stacked up immediately behind box 1 (not shown) at the main holding station will be conveyed downstream to contact box stop B6 and pushed therefrom in close succession to box 1 if primary photocell switch P1, or any other box requesting photocell switch at any station is calling for a box.

Figure 2:
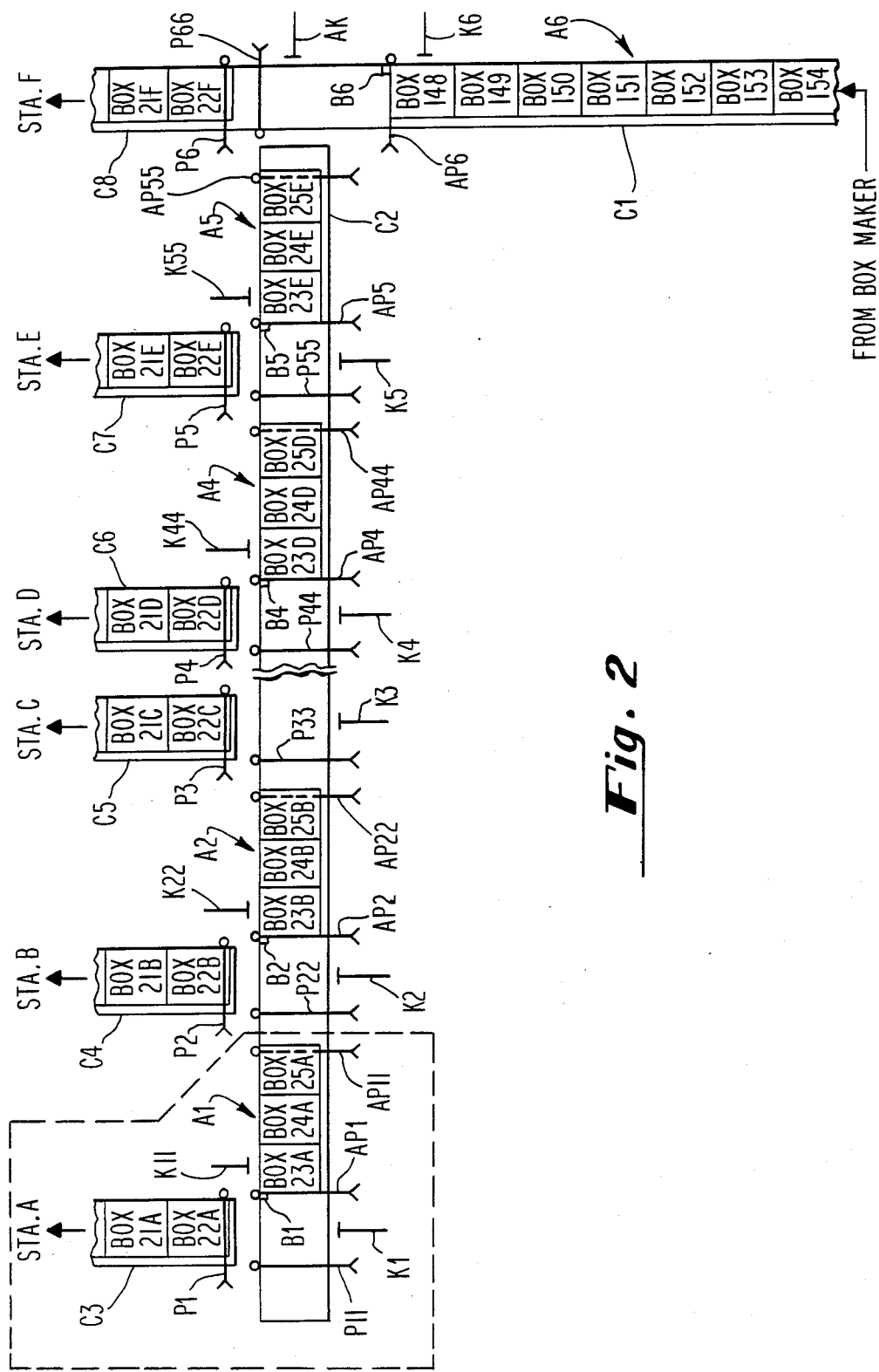
FIG. 2 is a schematic drawing similar to FIG. 1 including boxes accumulated at various stations, the microprocessor and leads thereto not shown for purposes of clarity of illustration.

In further clarification, reference is now made to FIG. 2 of the drawings wherein each of stations A through F is shown having its box accumulation requirement satisfied, i.e., with boxes 22A through 22F.

While each of box accumulation stations A through F for the handpackers are being satisfied in sequential order, the accumulation buffer photo switches AP11, AP22, etc. are requesting boxes for accumulation at buffer stations A1, A2, etc. Thus, immediately subsequent to box 22F activating normally closed photocell switch P6, the microprocessor will actuate main accumulation kicker AK to push box 133 (not shown-the next succeeding box following box 132, the product of 6×22) onto conveyor C2 where the box will come to rest against box stop B1 at accumulation buffer station A1 feeding station A, and so on, until each of the accumulation buffer stations is satisfied.

An accumulation buffer station may be provided at station F by the simple expediency of moving photo switch P6 farther downstream to thereby provide space for accommodating several boxes, and also providing a kicker and box stop appropriately positioned. As aforementioned, the microprocessor may temporarily disarm accumulation kicker AK whenever station F requests a box or boxes.

Let us now assume that all stations are satisfied, i.e, the accumulation stations for handpackers at stations A through F and accumulation buffer stations A1 through A5. Let us further assume that box 22D of station D, for example, has advanced toward the handpacker causing photo switch P4 to input a signal to the microprocessor which actuates kicker K44 to push box 23D away from box stop B4 enabling conveyor belt C2 to transport box 23D downstream to break the photobeam of normally open photo switch P44 which then actuates kicker K4 to push box 23D onto conveyor C6 resulting in box 23D stacking up immediately behind box 22D and thereby satisfying normally closed primary request photo switch P4. In production, conveyor belt C2 is normally continuously moving. Thus, as soon as box 23D is moved away from box stop B4 to travel downstream, box 24D moves downstrean on belt C2 until it impacts box stop B4. Similarly, box 25D stacks up against box 24D, and box 23E stacks up against box 25D. The presence of box 23E in accumulation buffer station A4 satisfies the accumulation requirements for that station; hence, normally closed accumulation request photocell switch AP44 no longer calls for a box. While accumulation buffer station A4 was being satisfied, accumulation buffer station A5 was similarly being satisfied by box 148 being pushed thereinto after exiting main holding station A6.

In effect, any box pushed from belt C2 to belts C3 through C7 to satisfy a primary request of one or more of stations A through E, results in the next box upstream of the pushed box in an accumulation buffer station replacing the pushed box, with succeeding upstream boxes continuously moving downstream to satisfy all downstream accumulation buffer stations. When box 22F moves downstream, the box being restrained by box stop B6 at the main holding station will replace box 22F (shown as box 148) and succeeding boxes, if needed.

Components associated with station A, for example, are shown embraced within the dashed lines of FIG. 2.

It is apparent from the above description that we have provided an improved box conveying and indexing system for use with articles, typically fruit, to be packed into boxes. That, after start-up, any call or request for a box from any station will always be immediately fulfilled by a box in closest upstream proximity thereto, and that the box from the accumulation buffer station satisfying the void will always be immediately replaced by another box from that accumulation buffer station and/or the lead box from a succeeding or upstream accumulation buffer station. A request for a box from station F results in the release of a box from the main box holding station.

Thus, time-consuming delays between box request and box arrival with accompanying problems created thereby and disadvantage resulting therefrom so prevalent in existing box conveying systems have been substantially eliminated by the improved box conveying and indexing system of the present invention.

Tables I and II below present data for all photocell switches and kickers respectively shown in the drawings and used in the present invention.

TABLE I

PHOTOCELL SWITCH DATA

| Designation | Station | Function | Switch Contact |
|---|---|---|---|
| P1 | A | Request, primary | N.C. |
| P2 | B | Request, primary | N.C. |
| P3 | C | Request, primary | N.C. |
| P4 | D | Request, primary | N.C. |
| P5 | E | Request, primary | N.C. |
| P6 | F | Request, primary | N.C. |
| AP11 | A | Accumulation Request | N.C. |
| AP22 | B | Accumulation Request | N.C. |
| AP44 | D | Accumulation Request | N.C. |
| AP55 | E | Accumulation Request | N.C. |
| AP1 | A | Accumulation Box Present | N.O. |
| AP2 | B | Accumulation Box Present | N.O. |
| AP4 | D | Accumulation Box Present | N.O. |
| AP5 | E | Accumulation Box Present | N.O. |
| AP6 | F | Accumulation Box Present | N.O. |
| P11 | A | Pusher out | N.O. |
| P22 | B | Pusher out | N.O. |
| P33 | C | Pusher out | N.O. |
| P44 | D | Pusher out | N.O. |
| P55 | E | Pusher out | N.O. |
| P66 | F | Main Accumulation Pusher | N.O. |

TABLE II

KICKER (PUSHER, INDEXER) DATA

| Designation | Station | Function |
|---|---|---|
| K1 | A | Pusher |
| K2 | B | Pusher |
| K3 | C | Pusher |
| K4 | D | Pusher |
| K5 | E | Pusher |
| K6 | F | Accumulation Box Release |
| K11 | A | Accumulation Box Release |
| K22 | B | Accumulation Box Release |
| K44 | D | Accumulation Box Release |
| K55 | E | Accumulation Box Release |
| AK | F | Accumulation Pusher |

We claim:

1. A box conveying and indexing system for feeding boxes to a plurality of box packing stations upon request therefrom to maintain a given accumulation of boxes thereat, said system comprising moving conveyor belt means for conveying boxes in said system, a box accumulation buffer station formed on said moving conveyor belt means immediately upstream each of said packing stations, restraining means for temporarily maintaining each of said accumulation buffer stations in place on said moving conveyor belt means, detecting means associated with each of said packing stations for indicating when accumulation of boxes thereat falls below a given number, said detecting means inputting a signal to microprocessor means for generating an appropriate output signal, indexing means responsive to said detecting means and output signal for pushing a most downstream box from a donor buffer station in closest upstream proximity to said packing station where accumulation of boxes fell below said given number, means for causing at least one lesser downstream box of said donor buffer station to move downstream to replace said most downstream box, and boxes in each buffer station upstream said donor buffer station to move sequentially downstream to satisfy accumulation requirements of each of said upstream accumulation buffer stations, and means for supplying boxes to said system from a main box holding station.

2. System of claim 1 wherein said indexing means pushes next most downstream boxes sequentially from said accumulation buffer station in closest proximity to said packing station where accumulation of boxes fell below said given number.

3. System of claim 1 wherein said indexing means pushing said box to said packing station where accumulation of boxes fell below said given number brings accumulation of boxes thereat up to said given number.

4. System of claim 1 wherein said detecting means comprises a photocell switch disposed at an upstream end of each of said packing stations, said photocell switch inputting a signal to said microprocessor means requesting a box to be accumulated at said packing station to be pushed from said buffer station in closest upstream proximity thereto.

5. System of claim 3 wherein said indexing means includes a pair of spaced photocell switches substantially defining an accumulation buffer station therebetween, the downstream of said switches indicating presence of a box thereat and upstream of said switches generating an input signal to said microprocessor means requesting a most downstream disposed box from closest upstream accumulation buffer station to be supplied to said packing station requesting said box.

6. System of claim 5 wherein said downstream switch of said switches is normally open and said upstream switch of said switches is normally closed.

7. System of claim 6 wherein said indexing means further includes a first photoswitch immediately downstream said downstream switch of said pair of spaced photocell switches, said first photoswitch generating an input signal to said microprocessor means to generate an output signal for actuating pusher means to push said box to said packing station.

8. System of claim 7 wherein said first photoswitch is normally open.

9. System of claim 7 wherein said pusher means comprises a pneumatic or hydraulic type solenoid directional control valve.

10. System of claim 1 wherein one of said plurality of packing stations accumulates boxes from said main box holding station by said moving conveyor belt means comprising one continuous continuously moving belt.

* * * * *